United States Patent
Owens et al.

(10) Patent No.: US 11,636,561 B1
(45) Date of Patent: Apr. 25, 2023

(54) SYSTEM AND PROCESS FOR SELECTING, RESERVING, AND PURCHASING MAUSOLEUM CEMETERY PROPERTY AND SERVICES VIA CLOUD APPLICATION SERVICE

(71) Applicants: George Joseph Owens, Woodland Hills, CA (US); Barry Oren Rappaport, Encino, CA (US)

(72) Inventors: George Joseph Owens, Woodland Hills, CA (US); Barry Oren Rappaport, Encino, CA (US)

( * ) Notice: Subject to any disclaimer, the term of this patent is extended or adjusted under 35 U.S.C. 154(b) by 32 days.

(21) Appl. No.: 17/236,811

(22) Filed: Apr. 21, 2021

(51) Int. Cl.
*G06Q 10/02* (2012.01)
*G06Q 50/16* (2012.01)
*G06F 3/0482* (2013.01)
*G06F 9/451* (2018.01)
*H04L 67/141* (2022.01)
*G06Q 10/087* (2023.01)

(52) U.S. Cl.
CPC ......... *G06Q 50/167* (2013.01); *G06F 3/0482* (2013.01); *G06F 9/451* (2018.02); *G06Q 10/02* (2013.01); *G06Q 10/087* (2013.01); *H04L 67/141* (2013.01)

(58) Field of Classification Search
CPC .... G06Q 50/167; G06Q 10/02; G06Q 10/087; G06F 3/0482; G06F 9/451; H04L 67/141
See application file for complete search history.

(56) References Cited

U.S. PATENT DOCUMENTS

| | | | | |
|---|---|---|---|---|
| 4,780,994 A * | 11/1988 | Chen | ...................... | E04H 13/00 52/134 |
| 7,725,359 B1 * | 5/2010 | Katzfey | ............. | G06Q 30/0601 705/26.1 |
| 8,024,234 B1 * | 9/2011 | Thomas | ................. | G06Q 10/02 705/26.1 |
| 8,140,421 B1 * | 3/2012 | Humphries | .......... | G06Q 20/105 705/40 |
| 10,922,767 B2 * | 2/2021 | Cook | ................. | G06Q 30/0601 |
| 10,954,688 B2 * | 3/2021 | Green | ................. | A61G 17/048 |
| 11,069,010 B1 * | 7/2021 | Shenoy | ................ | G06F 16/951 |
| 11,244,412 B1 * | 2/2022 | Phillips | ............. | G06Q 30/0621 |
| 11,379,897 B1 * | 7/2022 | Thomas | ............. | G06Q 30/0623 |
| 11,393,056 B1 * | 7/2022 | Spickes | ................. | G06Q 10/04 |
| 2008/0109756 A1 * | 5/2008 | Stambaugh | ........... | G06F 3/0481 715/835 |
| 2012/0116983 A1 * | 5/2012 | Mak | ..................... | G06Q 50/163 705/314 |
| 2012/0246024 A1 * | 9/2012 | Thomas | ................. | G06Q 30/06 705/27.1 |
| 2013/0268899 A1 * | 10/2013 | Valentino | ............... | G06Q 10/02 715/852 |
| 2014/0136372 A1 * | 5/2014 | Pinocchio | .......... | G06Q 30/0625 705/26.62 |

(Continued)

*Primary Examiner* — Hien L Duong
(74) *Attorney, Agent, or Firm* — Plager Schack LLP; Mark H. Plager; Stephen Hallberg

(57) ABSTRACT

A system and process for selecting, reserving, and purchasing mausoleum cemetery property and services via cloud application service is disclosed. The system and process for selecting, reserving, and purchasing mausoleum cemetery property and services via cloud application service provides an online e-commerce solution for selecting, reserving and purchasing mausoleum cemetery property and services.

14 Claims, 5 Drawing Sheets

(56) References Cited

U.S. PATENT DOCUMENTS

| | | | |
|---|---|---|---|
| 2014/0195277 A1* | 7/2014 | Kim | G08B 5/221 |
| | | | 705/5 |
| 2016/0196624 A1* | 7/2016 | Brukarz | G06Q 30/0601 |
| | | | 705/26.1 |
| 2016/0253771 A1* | 9/2016 | Pinocchio | G06Q 50/186 |
| | | | 705/27.2 |
| 2018/0101793 A1* | 4/2018 | Steinberg | G06F 16/9535 |
| 2018/0270245 A1* | 9/2018 | Akkaraju | G06F 21/10 |
| 2019/0026659 A1* | 1/2019 | Yakubovich | G06Q 10/02 |
| 2020/0118091 A1* | 4/2020 | Bartrim | G06Q 20/0855 |
| 2020/0387838 A1* | 12/2020 | Stam | G06Q 10/02 |
| 2021/0005084 A1* | 1/2021 | Isgar | H04W 4/021 |
| 2021/0118074 A1* | 4/2021 | Liu | G06F 9/547 |

\* cited by examiner

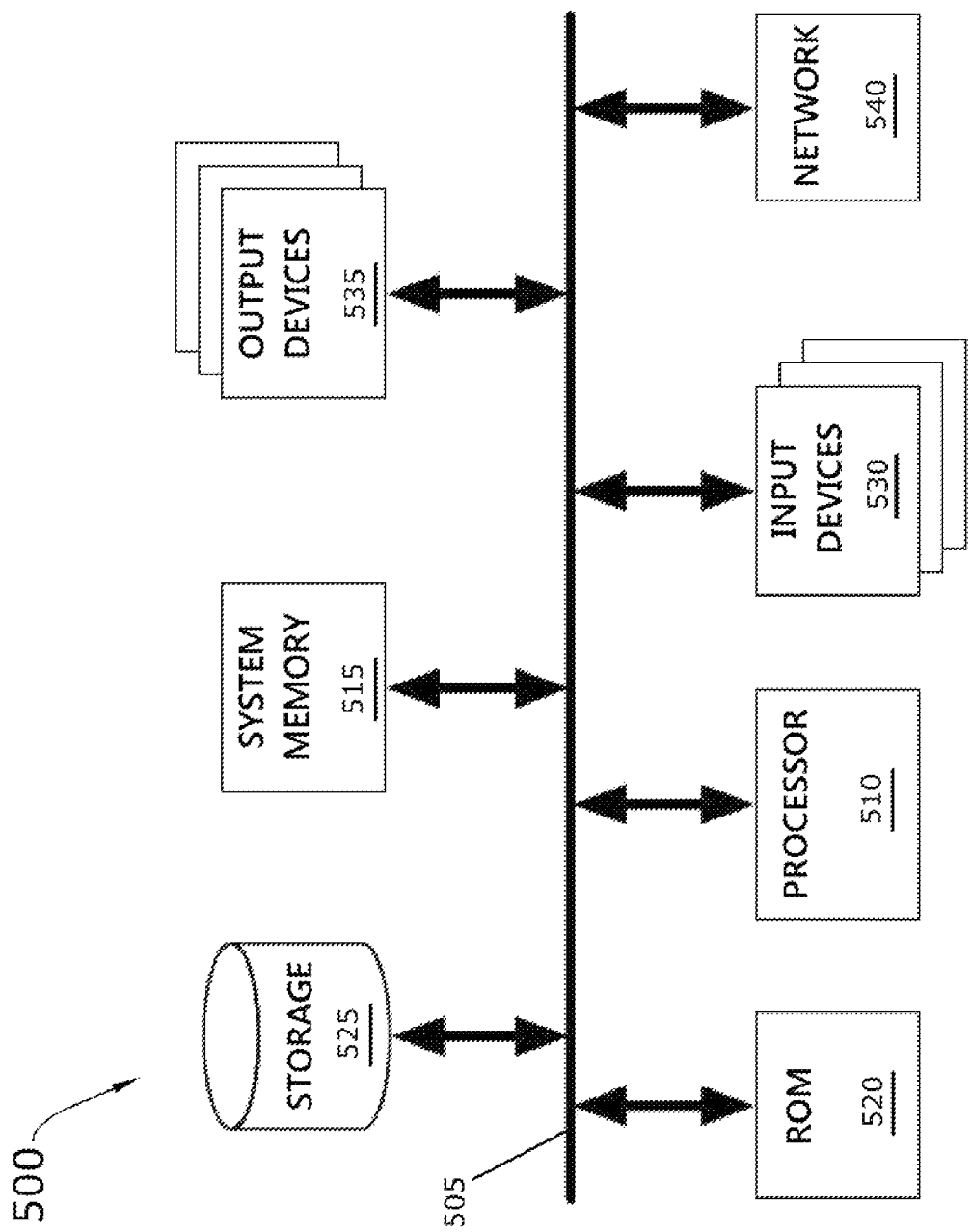

SYSTEM AND PROCESS FOR SELECTING, RESERVING, AND PURCHASING MAUSOLEUM CEMETERY PROPERTY AND SERVICES VIA CLOUD APPLICATION SERVICE

BACKGROUND

Embodiments of the invention described in this specification relate generally to arranging for mausoleum cemetery property and services, and more particularly, to a system and process for selecting, reserving, and purchasing mausoleum cemetery property and services via cloud application service.

It is not currently possible for someone to select, purchase and secure cemetery mausoleum property online. Today, a person looking to select, purchase, and secure cemetery mausoleum property must appear in-person to start and complete the process. Many people cannot easily participate in this in-person process due to age or health reasons. Also, it is routinely expected that many people prefer to be cautious in making in-person visits with others due to social distancing recommendations or concern over the possibility of being infected by viruses, such as COVID-19 or yearly flu viruses, and/or other infectious diseases. Currently, there is no way to get around the in-person requirement for completing this process.

Another problem is that there is little to no transparency in pricing services, leaving people to make rounds in order to compare pricing to find one that aligns better with their needs. Without pricing transparency, the process for selecting, reserving, and purchasing mausoleum cemetery property and services becomes less efficient.

Therefore, what is needed is a way to efficiently present cemetery mausoleum property with transparent pricing for a person to select, purchase, and secure cemetery mausoleum property without having to appear in-person.

BRIEF DESCRIPTION

A novel system and process for selecting, reserving, and purchasing mausoleum cemetery property and services via cloud application service is disclosed. In some embodiments, the system and process for selecting, reserving, and purchasing mausoleum cemetery property and services via cloud application service provides an online e-commerce solution for selecting, reserving and purchasing mausoleum cemetery property and services.

In some embodiments, the system and process for selecting, reserving, and purchasing mausoleum cemetery property and services via cloud application service provides pricing transparency. By increasing pricing transparency, the system and process for selecting, reserving, and purchasing mausoleum cemetery property and services via cloud application service makes the entire process more efficient and is able to more effectively reach a greater portion of the population in need of mausoleum properties, products, and/or services.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein:

FIG. 5 conceptually illustrates an electronic system with which some embodiments of the invention are implemented.

DETAILED DESCRIPTION

Figure 1:
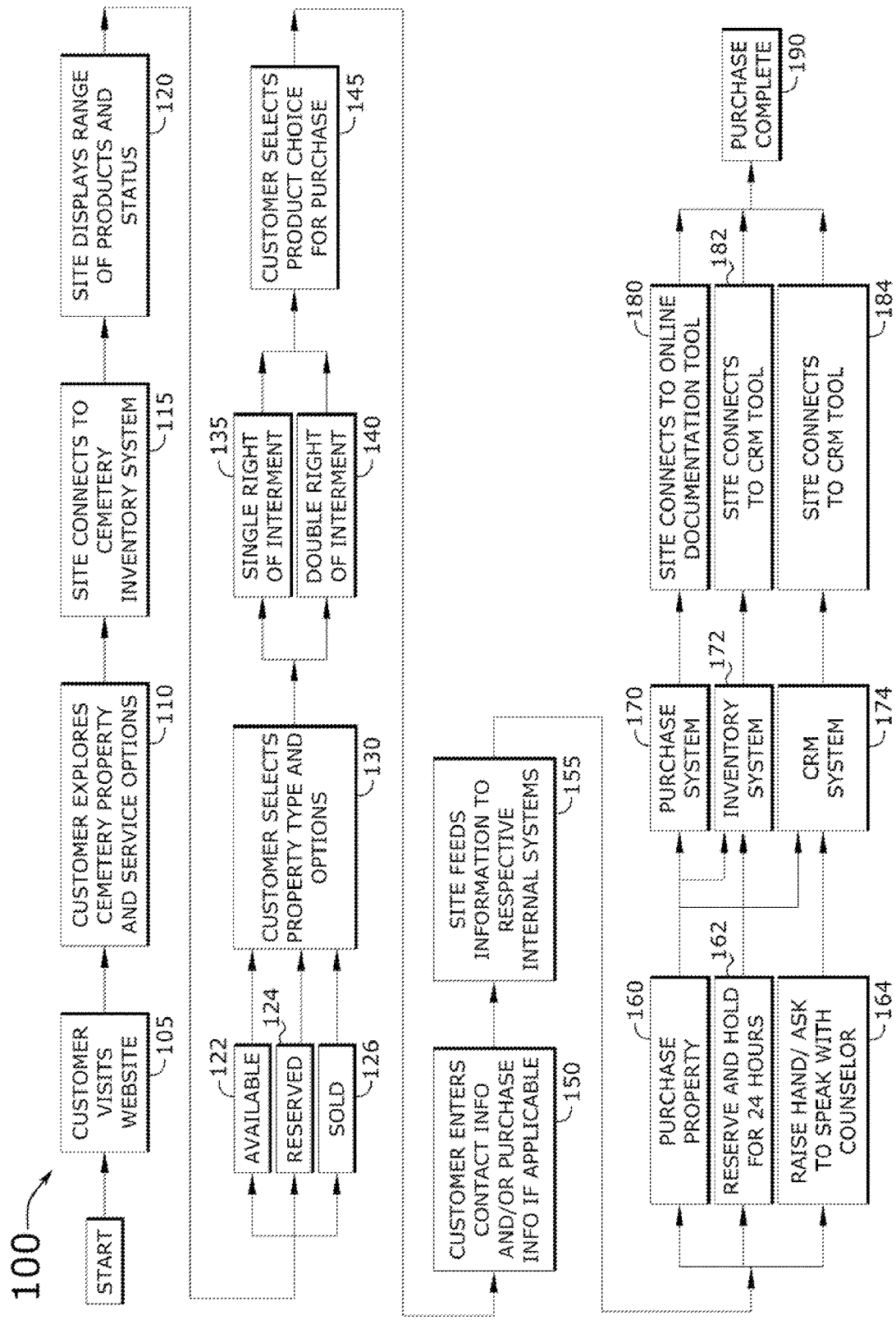
FIG. 1 conceptually illustrates a process for selecting, reserving, and purchasing mausoleum cemetery property and services via cloud application service in some embodiments.

In the following detailed description of the invention, numerous details, examples, and embodiments of the system and process for selecting, reserving, and purchasing mausoleum cemetery property and services via cloud application service are described. However, it will be clear and apparent to one skilled in the art that the invention is not limited to the embodiments set forth and that the invention can be adapted for any of several applications.

In this specification, reference is often made to "mausoleum cemetery property and services" or "mausoleum cemetery products". However, for purposes of describing the various embodiments, reference to "mausoleum property," "mausoleum cemetery property," "mausoleum cemetery property and services," "mausoleum cemetery products," and so forth, are not intended to limit these embodiments to only mausoleum cemetery properties or services, but instead, are meant to include grave spaces, mausoleum cemetery or grave space services and service packages, cremations, as well as related ancillary products and services such as caskets, plaques, urns, etc.

Some embodiments of the invention include a novel system and process for selecting, reserving, and purchasing mausoleum cemetery property and services via cloud application service. In some embodiments, the system and process for selecting, reserving, and purchasing mausoleum cemetery property and services via cloud application service provides an online e-commerce solution for selecting, reserving and purchasing mausoleum cemetery property and services.

As stated above, it is not currently possible for someone to select, purchase and secure cemetery mausoleum property online. Today, a person looking to select, purchase, and secure cemetery mausoleum property must appear in-person to start and complete the process. Many people cannot easily participate in this in-person process due to age or health reasons. Furthermore, it is routinely expected that many people prefer to be cautious in making in-person visits with others due to social distancing recommendations or concern over the possibility of being infected by viruses, such as COVID-19 or yearly flu viruses, and/or other infectious diseases. Currently, there is no way to get around the in-person requirement for completing this process. Embodiments of the invention described in this specification solve such problems by providing a system and process for selecting, reserving, and purchasing mausoleum cemetery property and services via cloud application service, which is interactive and can be started and completed entirely online. Accordingly, a person who interacts with a user interface (UI) of the system and process for selecting, reserving, and purchasing mausoleum cemetery property and services via cloud application service can navigate through various cemetery mausoleum sites to identify a particular property of choice. Similarly, an owner, an agent, or hired personnel of a cemetery mausoleum entity can use the system and process for selecting, reserving, and purchasing mausoleum cemetery property and services via cloud application service to promote, present, and sell properties of this type online.

Embodiments of the system and process for selecting, reserving, and purchasing mausoleum cemetery property and services via cloud application service described in this specification differ from and improve upon currently existing options. In particular, the existing, conventional options available today do not provide any way to conduct business online—for selection of a property, purchase, promotion, selling, etc. By contrast, the system and process for selecting, reserving, and purchasing mausoleum cemetery property and services via cloud application service of the present disclosure offers a full online experience for customers who would prefer to conduct business online. This experience includes all aspects of navigation—choosing between different sites, and within each site, choosing particular properties, reserving properties, paying for properties, etc., while also providing corresponding services for the supply-side, whereby owners, agents, and/or personnel can promote a mausoleum cemetery, conduct transactions for properties, provide information and details about the site and individual properties that are available, and otherwise engage in the provisioning of mausoleum cemetery properties which has been, to date, only available through face-to-face interaction and transactions.

The process for selecting, reserving, and purchasing mausoleum cemetery property and services via cloud application service of the present disclosure may be comprised of the following steps. This list of possible constituent steps is presented at a high level of abstraction to round out the pertinent details involved in using the system and process for selecting, reserving, and purchasing mausoleum cemetery property and services via cloud application service. Therefore, persons having ordinary skill in the art relevant to the present disclosure may understand there to be equivalent steps that may be substituted within the present disclosure without changing the essential function or operation of the process for selecting, reserving, and purchasing mausoleum cemetery property and services via cloud application service.

1. A customer visits a cemetery web site, which includes a web app that implements the process for selecting, reserving, and purchasing mausoleum cemetery property and services via cloud application service and which connects to a backend server that hosts the cloud application service for the system for selecting, reserving, and purchasing mausoleum cemetery property and services via cloud application service.

2. The customer navigates through the site and property options to identify and select a type of mausoleum property that customer would be interested in purchasing. The customer may request to meet with a sales representative (if so, a lead is provided to a particular sales representative to follow-up with the customer).

3. The customer selects the property type and, if committed, can purchase the property immediately (either by payment in full or by selecting a pay-over-time option with a down payment). Alternatively, instead of immediately purchasing the property, the customer can reserve the selected property to hold for a period of time (e.g., 24 hours); later the customer completes the transaction in a single payment or by making a deposit with multiple subsequent payments. Transaction payment (whether immediate purchase or reserved property followed by payment) results in purchase of the selected property and can be made by credit card, bank payment or transfer, cryptocurrency, etc.

4. The customer then receives interment right information (documentation) online via email.

5. The system for selecting, reserving, and purchasing mausoleum cemetery property and services via cloud application service automatically sends the customer a confirmation (email) upon each completed transaction (i.e., reservation, deposit, full payment, etc.).

By way of example, FIG. 1 conceptually illustrates a process 100 for selecting, reserving, and purchasing mausoleum cemetery property and services via cloud application service. As shown in this figure, the process 100 starts when a customer visits a website (at 105) associated with a particular cemetery. The website is part of the cloud application service hosted by a server of the system for selecting, reserving, and purchasing mausoleum cemetery property and services. A user session is started by the cloud application service to manage and track user interactions with the website. Once the user session is started, the customer explores cemetery properties and service options (at 110) in connection with a cemetery inventory system (at 115). The cemetery inventory system of some embodiments is associated with a cemetery cloud database that is accessible by way of the cloud application service. Based on review of the cemetery inventory system, the process 100 identifies a range of products and status of those products, and then visually outputs the range of products and status to the website (at 120). Each product that is shown on the website includes a status comprising one of available (at 122), reserved (at 124), and sold (at 126). Next, the process 100 moves forward to a step whereby the customer selects a property type and options (at 130) for the property. Options include either a single right of interment (at 135) or a double right of interment (at 140).

After connecting, viewing, and selecting a property type and options through the website, the process 100 of some embodiments proceeds to the next step at which the customer selects a product choice for purchase (at 145). The customer then enters contact information (at 150) and optionally, purchase information when applicable. The process 100 proceeds to a step in which the website feeds information to one or more respective internal systems (at 155). Then the process 100 transitions to the next step for optionally selecting to purchase the property (at 160), reserve and hold the property for twenty-four hours (at 162), or request communication with a counselor (at 164) to ask a question or obtain more information. When the customer purchases the property (at 160), the process 100 triggers the website to connect, via the cloud application service, to three backend cloud system services, namely, a purchase system (at 170), an inventory system (at 172), and a customer relationship management (CRM) system (at 174). However, when the customer reserves and holds the property for twenty-four hours (at 162), the process 100 triggers the website to connect only to the inventory system (at 172). Yet, when the customer requests communication with a counselor (at 164), the process 100 triggers the website to connect only to the CRM system (at 174). When the website connects to the purchase system (at 170), the process 100 also triggers the website to connect to an online documentation tool (at 180). Similarly, when the website connects to the inventory system (at 172) or the CRM system (at 174), the process 100 triggers the website to connect to a CRM tool (at 182 and at 184). Then the process 100 proceeds to complete the purchase (at 190).

Figure 2:
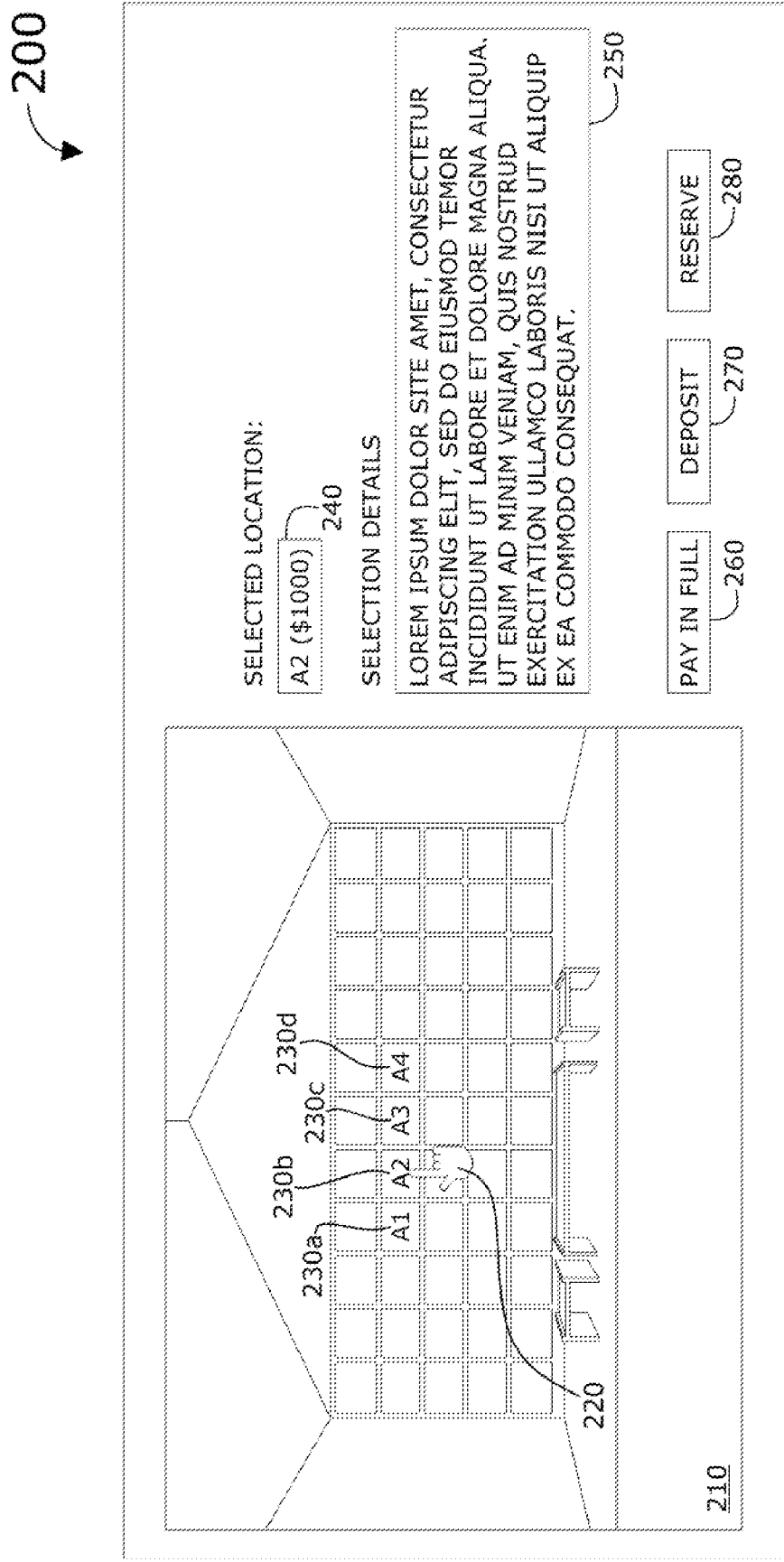
FIG. 2 conceptually illustrates a user selection and reservation view of a user interface (UI) of an application that connects to a system that hosts a cloud application service for selecting, reserving, and purchasing mausoleum cemetery property and services in some embodiments.

By way of an example for interacting with the system for selecting, reserving, and purchasing mausoleum cemetery property and services via cloud application service, FIG. 2 conceptually illustrates a user selection and reservation view of a user interface (UI) 200 of an application that connects to a system that hosts a cloud application service for selecting, reserving, and purchasing mausoleum cemetery property and services. As shown in this figure, the user selection and reservation view of the UI 200 includes a visual display area 210 that demonstrates a virtual perspective view of a mausoleum. The user selection and reservation view of the UI 200 also includes a user selection tool 220, a plurality of properties (namely, a first "A1" property 230a, a second "A2" property 230b, a third "A3" property 230c, and a fourth "A4" property, among other unlabeled properties in this mausoleum view), a selected location and price field 240, a selection details field 250, a pay in full tool 260, a deposit tool 270, and a reserve tool 280. Thus, when a user is connected to the website for the mausoleum, the user can select various properties by way of clicking on individual properties with the user selection tool 220. In this example, the user has clicked on the second A2 property 230b. As a result of this selection, the selected location and price file 240 updates the information displayed by connecting to the inventory management system (backend system) to determine type of property, status, and price (based on type and location, and/or other factors). Details are also shown in the selection details field 250 to provide the user with basic information about the selected property. The user can purchase the second A2 property 230b by either selecting the pay in full tool 260 to pay the full amount due to purchase the second A2 property 230b (for $1000 in this example) or the deposit tool 270 to deposit a portion of the full amount due to purchase the second A2 property 230b. In some embodiments, the second A2 property 230b is not 'purchased' simply by selection of the deposit 270 and depositing of the portion of the full amount; rather, the website would display another page that would include routine payment agreements which the user would need to approve and authorize (e.g., by electronic signature) to bind the user to monthly (or other term) payments toward the full amount due for purchase of the second A2 property 230b. The user selection and reservation view of the UI 200 includes another option that secures a selected property for a time, by way of the reserve tool 280. In this way, selection of the reserve tool 280 allows the user to reserve the second A2 property 230b for a specific limited amount of time (e.g., 24 hours), before deciding to pay for the property or not.

Figure 3:
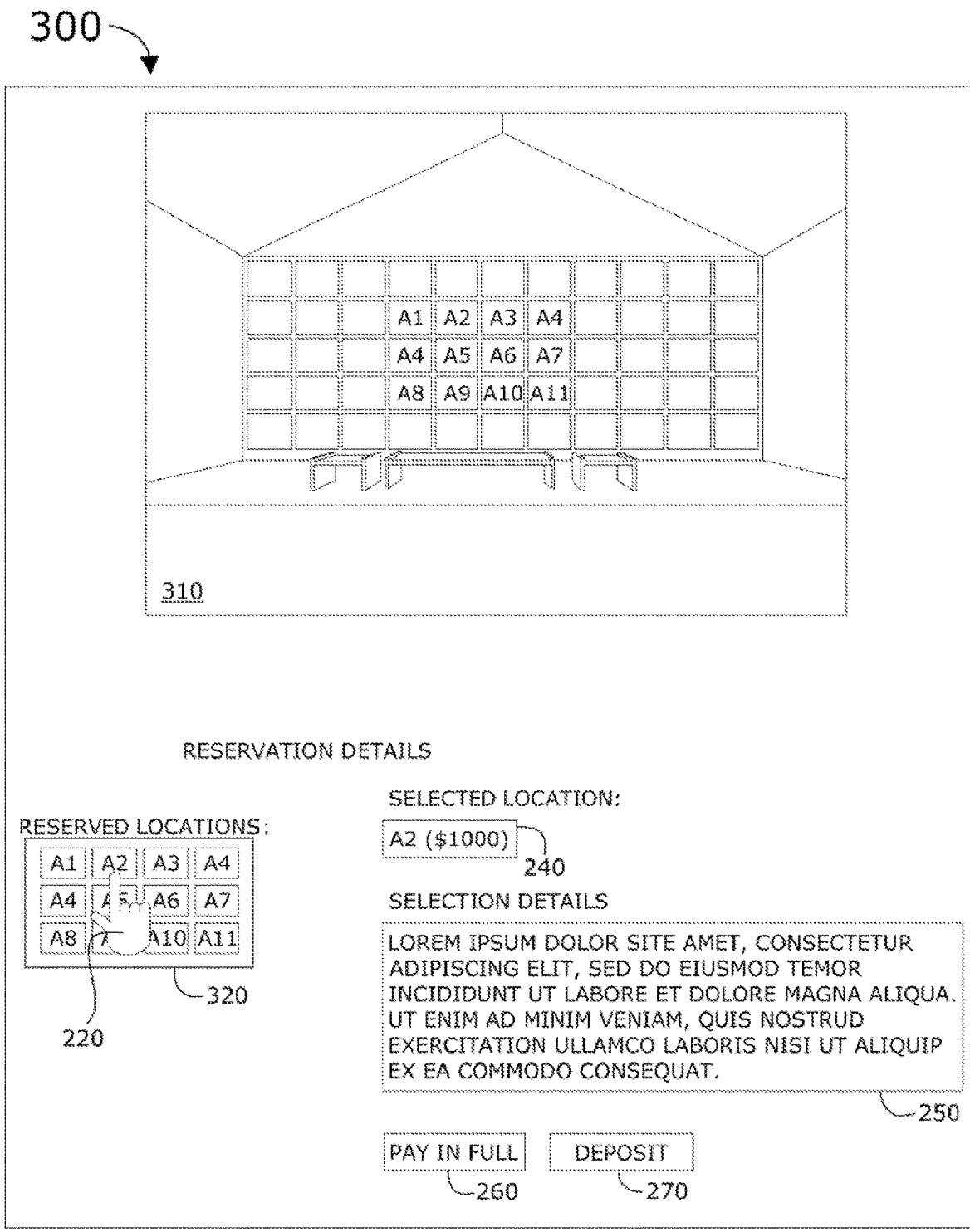
FIG. 3 conceptually illustrates a reservation details and transaction purchasing view of the UI of the application that connects to a system that hosts a cloud application service for selecting, reserving, and purchasing mausoleum cemetery property and services in some embodiments.

Now referring to another example of the user interface, FIG. 3 conceptually illustrates a reservation details and transaction purchasing view of the UI 300 of the application that connects to a system that hosts a cloud application service for selecting, reserving, and purchasing mausoleum cemetery property and services. As shown in this figure, the reservation details and transaction purchasing view of the UI 300 includes a visual display area 310 that shows reserved properties in the virtual perspective view of the mausoleum. The reservation details and transaction purchasing view of the UI 300 provides a selectable reserved location button area 320 that provides user selectable buttons for each reserved property corresponding to the reserved properties shown in the visual display area 310. In some embodiments, the visual display area 310 and the selectable reserved location button area 320 show all reserved properties in the virtual perspective view of the mausoleum. In this way, a user connecting to the website can find out information about the specific properties currently on reserve under his or her account and arrange to pay in full (via the pay in full tool 260) or make a deposit (via the deposit tool 270). Similarly, a mausoleum cemetery administrator or other personnel can see all reserved properties, and walk the user through payment (via the pay in full tool 260) or arranging a deposit (via the deposit tool 270).

The user can easily compare different reserved properties through this view since the selected location and price field 240 provide price information for purchase and highlights the respective property in the visual display area 310 when selected. Similarly, the selection details field 250 gives more details about the selected property. By selecting different buttons in the selectable reserved location button area 320, the user can quickly see their differences in price, location, and detail. In this way, when the user identifies the property wanted, the user can simply select one of the payment options (the pay in full tool 260 or the deposit tool 270) and complete the purchase transaction online (e.g., using a credit card, etc.). When a particular reserved property is selected and the user decides not to purchase it, the user may move on to others, reserve others that are currently not reserved, or pay for one or more of the other reserved properties. After the reservation time period expires, any reserved property that is not purchased is returned to the inventory management system in a state of 'available, unreserved', thereby allowing other users to purchase or reserve it.

Figure 4:
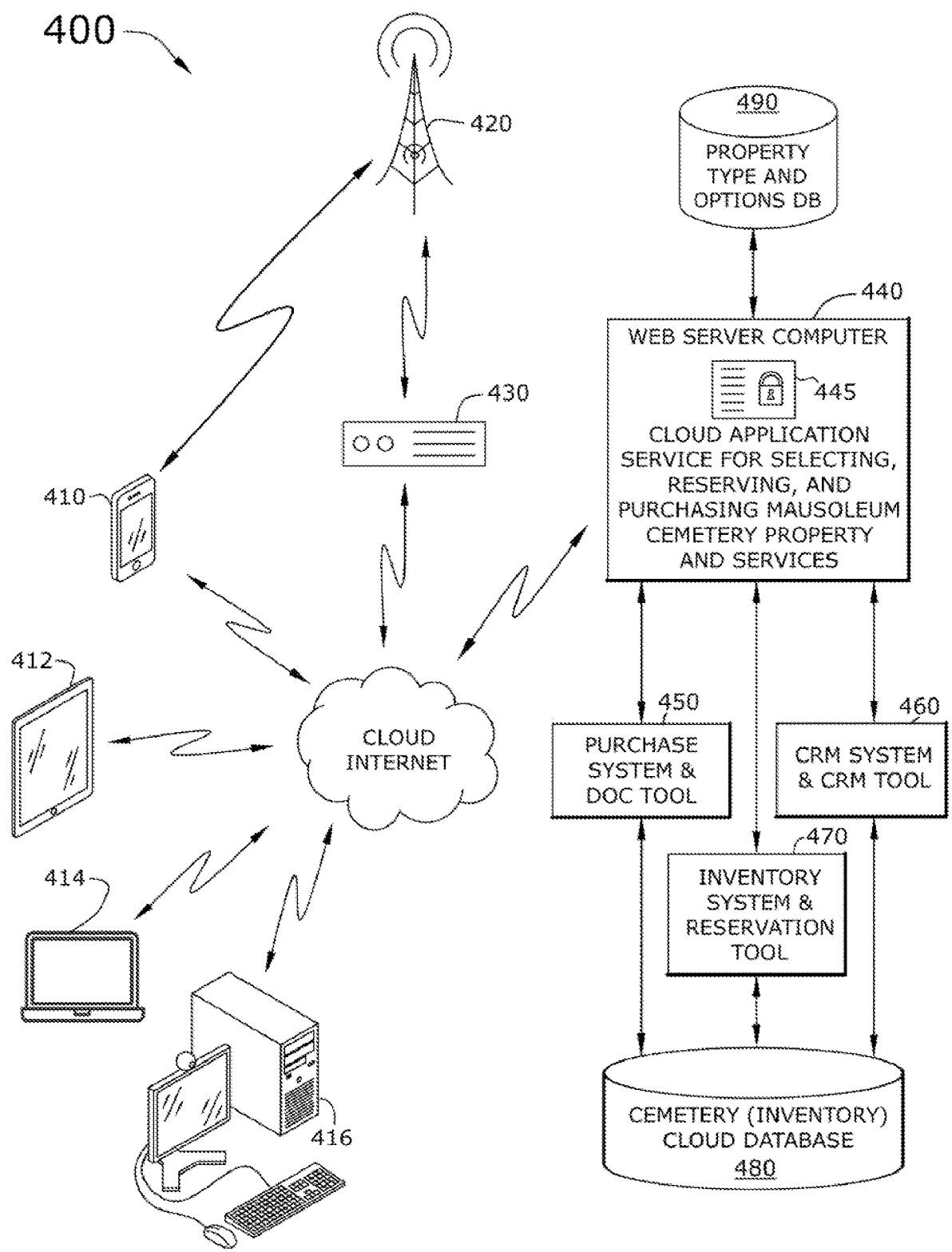
FIG. 4 conceptually illustrates a network architecture of a system that provides a cloud application service for selecting, reserving, and purchasing mausoleum cemetery property and services in some embodiments.

By way of example, FIG. 4 conceptually illustrates a network architecture of a system that provides a cloud application service for selecting, reserving, and purchasing mausoleum cemetery property and services in some embodiments. As shown in this figure, the network architecture of the system 400 includes a user mobile device 410, a user tablet computing device 412, a user laptop computing device 414, and a user computer 416. The network architecture of the system 500 also includes a wireless communication point 420 (e.g., a cell tower for cellular data communication), a gateway 430, a web server computer 440 that hosts a cloud application service for selecting, reserving, and purchasing mausoleum cemetery property and services, a user authentication and encryption module 445 that protects and secures user payment information through a payment portal that connects to a backend purchase system 450 and documentation tool, a customer relationship management (CRM) system and CRM tool 460, an inventory system and reservation tool 470, a cemetery (inventory) cloud database 480, and a property type and options database 490.

All user devices enable users or administrators to connect to the cloud application service over the Internet in order to view, select, reserve, or purchase mausoleum cemetery properties associated with a particular cemetery. The user devices similarly enable administrators to view, configure, update the website and the mausoleum cemetery information made available for viewing to the public, as well as to perform all of the user options on behalf of any user seeking assistance or requiring help in viewing, selecting, reserving, and/or purchasing a property available throughout the mausoleum website. The user devices connect to the website over the Internet or other wide network. When not nearby a WiFi location to make a network connection, the user mobile device 410, for example, can connect to a subscriber network, such as a cellular network, via the wireless communication point 420 and the gateway 430, to connect wirelessly to the Internet and, ultimately, to the website provided by the web server computer 440. The user devices all connect to the web server computer 440 by way of a software application or program running on a processor of the respective device, such as a web browser application or a mobile app. In this way, the user can visualize and interact with the different views of the user interface (UI) of the software application. Examples of two different UI views are described in detail above, by reference to FIGS. 2 and 3. While those example views of the UI demonstrate some key aspects of the system and process for selecting, reserving, and purchasing mausoleum cemetery property and services via cloud application service, a person of ordinary skill in the relevant art would appreciate that other UI views would be supported, such as a payment portal view to allow users to complete purchase transactions that are encrypted, via the user authentication and encryption module 445, or purchased property view that provides a custom view for user with title to one or more previously purchased properties and access to the ownership documentation and rights of interment (whichever options and details were provided in each individual purchase), and other such UI views.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 5 conceptually illustrates an electronic system 500 with which some embodiments of the invention are implemented. The electronic system 500 may be a computer, a tablet computing device, a laptop, a phone (cell phone, mobile phone, smartphone, etc.), PDA (iPod, other handheld computing device, etc.), or any other sort of electronic device or computing device. Such an electronic system includes various types of computer readable media and interfaces for various other types of computer readable media. Electronic system 500 includes a bus 505, processing unit(s) 510, a system memory 515, a read-only memory 520, a permanent storage device 525, input devices 530, output devices 535, and a network 540.

The bus 505 collectively represents all system, peripheral, and chipset buses that communicatively connect the numerous internal devices of the electronic system 500. For instance, the bus 505 communicatively connects the processing unit(s) 510 with the read-only memory 520, the system memory 515, and the permanent storage device 525.

From these various memory units, the processing unit(s) 510 retrieves instructions to execute and data to process in order to execute the processes of the invention. The processing unit(s) may be a single processor or a multi-core processor in different embodiments.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some embodiments of the invention use a mass-storage device (such as a magnetic or optical disk and its corresponding disk drive) as the permanent storage device 525.

Other embodiments use a removable storage device (such as a floppy disk or a flash drive) as the permanent storage device 525. Like the permanent storage device 525, the system memory 515 is a read-and-write memory device. However, unlike storage device 525, the system memory 515 is a volatile read-and-write memory, such as a random access memory. The system memory 515 stores some of the instructions and data that the processor needs at runtime. In some embodiments, the invention's processes are stored in the system memory 515, the permanent storage device 525, and/or the read-only memory 520. For example, the various memory units include instructions for processing appearance alterations of displayable characters in accordance with some embodiments. From these various memory units, the processing unit(s) 510 retrieves instructions to execute and data to process in order to execute the processes of some embodiments.

The bus 505 also connects to the input and output devices 530 and 535. The input devices enable the user to communicate information and select commands to the electronic system. The input devices 530 include alphanumeric keyboards and pointing devices (also called "cursor control devices"). The output devices 535 display images generated by the electronic system 500. The output devices 535 include printers and display devices, such as liquid crystal displays (LCD) or organic light emitting diode (OLED) displays. Some embodiments include devices such as a touchscreen that functions as both input and output devices.

Finally, as shown in FIG. 5, bus 505 also couples electronic system 500 to a network 540 through a network adapter (not shown). In this manner, the computer can be a part of a network of computers (such as a local area network ("LAN"), a wide area network ("WAN"), or an intranet), or a network of networks (such as the Internet). Any or all components of electronic system 500 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, disc media (CDs, DVDs, Blu-Ray® discs, ultra density optical discs), flash memory (e.g., SD cards, mini-SD cards, micro-SD cards, etc.), magnetic and/or solid state hard drives, or any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIG. 1 conceptually illustrates a process in which the specific operations of the process may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A process for selecting, reserving, and purchasing mausoleum cemetery property and services via cloud application service, said process comprising:

receiving a connection to a website from a user device;
starting a user session that supports the connection between the user device and the website;
transmitting a user interface (UI) of the website to the user device;
visually outputting a range of mausoleum cemetery properties in a visual display area of the UI on a screen of the user device;
providing a selection tool that allows a user of the user device to interact with the range of mausoleum cemetery properties in the visual display area;
receiving a selection of a particular mausoleum cemetery property by user activation of the selection tool on the visually displayed particular mausoleum cemetery property, wherein the selection triggers the website to retrieve (i) property type and options information from a property type of options database and (ii) property status and pricing information from a cemetery inventory cloud database;
visually outputting the (i) property type and options information and the (ii) property status and pricing information in the UI;
providing a plurality of purchase option tools comprising a purchase in full tool and a deposit tool;
providing a reserve tool that allows the user to reserve the particular mausoleum cemetery property for a specific amount of time; and
receiving a user selection of the deposit tool, wherein selection of the deposit tool triggers the website to connect to a purchase system and documentation tool through which the user completes a transaction for deposit of a portion of the full price for the particular mausoleum cemetery property, wherein the purchase system updates the cemetery inventory cloud database to change the status of the particular mausoleum cemetery property to not available, wherein the documentation tool generates a payment plan and partial purchase transaction documentation for the purchase.

2. The process for selecting, reserving, and purchasing mausoleum cemetery property and services via cloud application service of claim 1, wherein the website is associated with a particular cemetery.

3. The process for selecting, reserving, and purchasing mausoleum cemetery property and services via cloud application service of claim 2, wherein the UI of the website includes cemetery properties and service options in connection with a cemetery inventory system and associated cemetery inventory cloud database.

4. The process for selecting, reserving, and purchasing mausoleum cemetery property and services via cloud application service of claim 3, wherein the cemetery inventory cloud database is accessible to the user device by way of a cloud application service that is hosted by a system for selecting, reserving, and purchasing mausoleum cemetery property and services via cloud application service.

5. The process for selecting, reserving, and purchasing mausoleum cemetery property and services via cloud application service of claim 4, wherein the website is provided by a web server computer of the system for selecting, reserving, and purchasing mausoleum cemetery property and services via cloud application service.

6. The process for selecting, reserving, and purchasing mausoleum cemetery property and services via cloud application service of claim 1, wherein the specific amount of time is twenty-four hours.

7. The process for selecting, reserving, and purchasing mausoleum cemetery property and services via cloud application service of claim 1 further comprising receiving a user selection of the reserve tool, wherein selection of the reserve tool triggers the website to connect to an inventory system and reservation tool through which the user reserves the particular mausoleum cemetery property for the specific amount of time, wherein the status of the particular mausoleum cemetery property is changed by the inventory system to a reserved status, wherein the reserved status is changed to an available status by the inventory system automatically after the specific amount of time expires.

8. A process for selecting, reserving, and purchasing in full mausoleum cemetery property and services via cloud application service, said process comprising:

receiving a connection to a website from a user device;
starting a user session that supports the connection between the user device and the web site;

transmitting a user interface (UI) of the website to the user device;

visually outputting a range of mausoleum cemetery properties in a visual display area of the UI on a screen of the user device;

providing a selection tool that allows a user of the user device to interact with the range of mausoleum cemetery properties in the visual display area;

receiving a selection of a particular mausoleum cemetery property by user activation of the selection tool on the visually displayed particular mausoleum cemetery property, wherein the selection triggers the website to retrieve (i) property type and options information from a property type of options database and (ii) property status and pricing information from a cemetery inventory cloud database;

visually outputting the (i) property type and options information and the (ii) property status and pricing information in the UI;

providing a plurality of purchase option tools comprising a purchase in full tool and a deposit tool;

providing a reserve tool that allows the user to reserve the particular mausoleum cemetery property for a specific amount of time; and receiving a user selection of the purchase in full tool, wherein the user selection of the purchase in full tool triggers the website to connect to a purchase system and documentation tool through which the user completes a transaction for purchase of the particular mausoleum cemetery property, wherein the purchase system updates the cemetery inventory cloud database to change the status of the particular mausoleum cemetery property to not available, wherein the documentation tool generates title documentation and purchase transaction documentation for the purchase.

9. The process for selecting, reserving, and purchasing in full mausoleum cemetery property and services via cloud application service of claim 8, wherein the website is associated with a particular cemetery.

10. The process for selecting, reserving, and purchasing in full mausoleum cemetery property and services via cloud application service of claim 9, wherein the UI of the website includes cemetery properties and service options in connection with a cemetery inventory system and associated cemetery inventory cloud database.

11. The process for selecting, reserving, and purchasing in full mausoleum cemetery property and services via cloud application service of claim 10, wherein the cemetery inventory cloud database is accessible to the user device by way of a cloud application service that is hosted by a system for selecting, reserving, and purchasing mausoleum cemetery property and services via cloud application service.

12. The process for selecting, reserving, and purchasing in full mausoleum cemetery property and services via cloud application service of claim 11, wherein the website is provided by a web server computer of the system for selecting, reserving, and purchasing mausoleum cemetery property and services via cloud application service.

13. The process for selecting, reserving, and purchasing in full mausoleum cemetery property and services via cloud application service of claim 8, wherein the specific amount of time is twenty-four hours.

14. The process for selecting, reserving, and purchasing in full mausoleum cemetery property and services via cloud application service of claim 8 further comprising receiving a user selection of the reserve tool, wherein selection of the reserve tool triggers the website to connect to an inventory system and reservation tool through which the user reserves the particular mausoleum cemetery property for the specific amount of time, wherein the status of the particular mausoleum cemetery property is changed by the inventory system to a reserved status, wherein the reserved status is changed to an available status by the inventory system automatically after the specific amount of time expires.

* * * * *